United States Patent
Das et al.

(10) Patent No.: US 10,038,824 B1
(45) Date of Patent: Jul. 31, 2018

(54) PARTITIONING RASTER IMAGES FOR MULTIPLE PRINT COLORANT ORDERS

(71) Applicant: Xerox Corporation, Norwalk, CT (US)

(72) Inventors: Arindam Das, Konnagar (IN); Chiranjib Basu, Kolkata (IN); Michael A. Wiegand, Webster, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 15/485,339

(22) Filed: Apr. 12, 2017

(51) Int. Cl.
*H04N 1/60* (2006.01)
*G06K 15/02* (2006.01)
*H04N 1/00* (2006.01)

(52) U.S. Cl.
CPC ....... *H04N 1/6008* (2013.01); *G06K 15/1836* (2013.01); *H04N 1/00244* (2013.01); *H04N 1/00411* (2013.01); *H04N 2201/0094* (2013.01)

(58) Field of Classification Search
CPC ............. H04N 1/6008; H04N 1/00244; H04N 1/00411; H04N 2201/0094; G06K 15/1836
See application file for complete search history.

(56) References Cited

U.S. PATENT DOCUMENTS

| 4,743,962 | A | 5/1988 | McCormick | |
|---|---|---|---|---|
| 7,298,503 | B2 * | 11/2007 | Christiansen | G06F 3/1208 358/1.1 |
| 8,792,121 | B2 | 7/2014 | Henry et al. | |
| 8,867,065 | B2 | 10/2014 | Klassen | |
| 2005/0094190 | A1 | 5/2005 | Condon et al. | |
| 2012/0062939 | A1 * | 3/2012 | Miyazaki | G06F 3/1215 358/1.15 |

* cited by examiner

*Primary Examiner* — Quang N Vo
(74) *Attorney, Agent, or Firm* — Gibb & Riley, LLC

(57) ABSTRACT

According to exemplary methods, a print job is received into a computerized device that includes a marking device. The print job specifies an imposition template defining multiple logical pages for a single sheet of print media according to an electronic document. The print job attributes also contain a first print colorant order and a different second print colorant order. Groups of logical pages are defined for each print colorant order, and buffers are created in which raster data associated with each group of logical pages are merged and untouched pixels are marked as negative pixels. The information from each buffer is printed on a single sheet of print media. Following printing of each buffer, the sheet of print media is returned to the marking device, so that information from the next buffer can be printed on the same side of the sheet of print media, using the marking device.

20 Claims, 9 Drawing Sheets

PARTITIONING RASTER IMAGES FOR MULTIPLE PRINT COLORANT ORDERS

BACKGROUND

Systems and methods herein generally relate to machines having print engines such as printers and/or copier devices and, more particularly, to printer color management in image/text printing.

Printing presses (e. g., a digital front end (DFE) press) may be used in various printing systems and/or organizations for high volume printing. These printers are often designed to handle large customer workflows (e.g., thousands of copies of full-color magazines or brochures). A document can be created or received in electronic form on a device such as a personal computer, a personal digital assistant, or other suitable device. Raster image processing may be performed on very large print jobs during the printing of very large documents. Specifically, a document may be embodied in one of a number of page description languages that must be converted into raster bits in order to drive a printing device to print the various pixels, etc., on a page. Raster image processing may be performed, for example, by print engines associated with the printing presses.

Parameters of print jobs (such as for finishing, imposition, color management) can be set at the print queue, print job, page description language (PDL) creation, exception page creation, line printer remote (LPR), and job ticket level. Imposition settings are job settings that cause page images to be placed on print media at specific locations, orientations, and scalings. Typically, a user can format the document, adjust the layout of the document, change fonts, change font sizes, etc. For example, printing or rendering a surface on a sheet of print media using a user specified colorant order has been an existing and well-used feature in heavy production printing houses. In some cases, a spot color may be added before the standard color gamut (e.g., Gold+CMYK). In other cases, a spot color may be added after the standard color gamut (e.g., CMYK+Silver). However, it has been observed that if a single surface has different logical pages and the different logical pages require different print colorant order, then there is no design currently available to render images on the same side of a sheet using different print colorant orders. For instance, given X and Z as any spot color, a user may want one logical page on a sheet to be printed as X+CMYK+Z and another logical page on the same sheet to be printed as Z+CMYK+X in a single surface.

A need exists for a system and method that enables printing of multiple logical pages on a single sheet using different print colorant orders.

SUMMARY

According to systems and methods herein, a raster buffer can be generated in the image path in order to render a surface using user specified colorant order. In the printing domain, Imposition (N-Up, booklet, signature, etc.) is one of the widely used features that allows imposing multiple logical pages on a same surface. In production printing house, while using N-up imposition, there can be a requirement such as a user wanting to print one logical page using a specific colorant order including a spot color with the standard color gamut and another logical page, on the same sheet, in the reverse colorant order of the standard color gamut with the spot color. One such example can be printing one logical page using X+CMYK+Z order and another logical page, on the same sheet, using Z+CMYK+X order. This can be achieved by the Raster Image Processor (RIP) module of the printing device. For example, each logical surface can be decomposed according to the user specified colorant order. Before placing the consolidated raster for the given surface in the Buffer Manager, all the logical surfaces are collected in groups having the same colorant order. One buffer is generated (according to the dimensions of the selected print media) where the raster (data and tag) of logical pages that belong to same group get merged and untouched pixels are made as negative pixels. Likewise another buffer is generated to consolidate another set of the raster of the rest of the logical pages (i.e., the group having the different colorant order). The marker performs marking tasks separately for the two buffers. Once one raster is printed then the print media is again brought back to the print engine to print another raster of the different print colorant order on the same side of the sheet.

In operation, the processor receives a print job, and the processor automatically raster image processes print data in the print job to produce a bitmap for printing the images of the print job. An image may generally include different types of features, for example, black text on a white background, dark colored images on a light color background, light color images on dark color background, etc. According to user preference, a selected print colorant order may be provided for each logical sheet. The processor enables the use of multiple "planes" or layers for the purpose of representing each color, which may include spot colors. Each plane may represent the order in which the colorant will be rendered on the print media. For example, each plane may contain the pixels relating to each color and the order of the planes is the selected print colorant order. The processor creates a buffer for each print colorant order. That is, one buffer will contain the planes for logical pages having the same print colorant order. In this buffer, the pixels for the logical pages having a different print colorant order will be initialized with a value of zero. Another buffer will contain the planes for logical pages having the different print colorant order. In this other buffer, the pixels for the logical pages having the first print colorant order will be initialized with a value of zero.

When the image represented by the data structure is to be rendered or otherwise generated, the raster data in one buffer is sent to the marking device, which prints it on a sheet of print media. Then, the print media is returned to the marking device, and the raster data in the other buffer is sent to the marking device, which prints it on the same side of the same sheet of print media.

According to exemplary methods herein, a print job is received into a computerized device. The computerized device includes a marking device. The print job includes an electronic document and print job attributes including an imposition template defining multiple logical pages for a single sheet of print media according to the electronic document. The print job attributes contain a first print colorant order and a second print colorant order that is different from the first print colorant order. A first group of logical pages is defined. The first group of logical pages takes the first print colorant order, according to the print job. A second group of logical pages is defined. The second group of logical pages takes the second print colorant order, according to the print job. First information in created in a first buffer by merging raster data associated with the first group of logical pages and marking untouched pixels as negative pixels. Second information is created in a second buffer by merging raster data associated with the second group of logical pages and marking untouched pixels as negative pixels. The first information from the first buffer is printed on a sheet of print media, using the marking device. Following printing of the first information from the first buffer on the sheet of print media, the sheet of print media is returned to the marking device. The second information from the second buffer is printed on the same side of the sheet of print media, using the marking device.

According to exemplary methods herein, a print job is received into a computerized device. The print job includes an electronic document and print job attributes including an imposition template defining multiple logical pages for a single sheet of print media according to the electronic document. A menu option is displayed on a user interface of the computerized device, to define print colorant order for selected logical pages of the electronic document. The user interface receives input to identify a first print colorant order associated with a first group of logical pages and a second print colorant order associated with a second group of logical pages. The second print colorant order is different from the first print colorant order. First information is created in a first buffer by merging raster data associated with the first group of logical pages and marking untouched pixels as negative pixels. Second information is created in a second buffer by merging raster data associated with the second group of logical pages and marking untouched pixels as negative pixels.

A printing device herein includes an input device receiving a print job. The print job includes an electronic document and print job attributes including an imposition template defining multiple logical pages for a single sheet of print media according to the electronic document. The print job attributes contain a first print colorant order and a second print colorant order that is different from the first print colorant order. A processor is operatively connected to the input device. And, a marking device is operatively connected to the processor. The processor defines a first group of logical pages having the first print colorant order, according to the print job. The processor defines a second group of logical pages having the second print colorant order, according to the print job. The processor creates first information in a first buffer by merging raster data associated with the first group of logical pages and marking untouched pixels as negative pixels. The processor creates second information in a second buffer by merging raster data associated with the second group of logical pages and marking untouched pixels as negative pixels. The first information from the first buffer is printed on a sheet of print media, using the marking device. Following printing of the first information from the first buffer on the sheet of print media, the processor returns the sheet of print media to the marking device. The second information from the second buffer is printed on the same side of the sheet of print media, using the marking device.

According to a computer system for rendering a surface using user specified colorant order, the computer system contains a program product including a tangible computer readable storage medium having program code embodied therewith. The program code is readable and executable by a computerized device to provide an application to perform a method. According to the method, a print job is received into the computerized device. The computerized device includes a marking device. The print job includes an electronic document and print job attributes including an imposition template defining multiple logical pages for a single sheet of print media according to the electronic document. The print job attributes contain a first print colorant order and a second print colorant order that is different from the first print colorant order. A first group of logical pages is defined. The first group of logical pages takes the first print colorant order, according to the print job. A second group of logical pages is defined. The second group of logical pages takes the second print colorant order, according to the print job. First information is created in a first buffer by merging raster data associated with the first group of logical pages and marking untouched pixels as negative pixels. Second information is created in a second buffer by merging raster data associated with the second group of logical pages and marking untouched pixels as negative pixels. The first information from the first buffer is printed on a sheet of print media, using the marking device. Following printing of the first information from the first buffer on the sheet of print media, the sheet of print media is returned to the marking device. The second information from the second buffer is printed on the same side of the sheet of print media, using the marking device.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
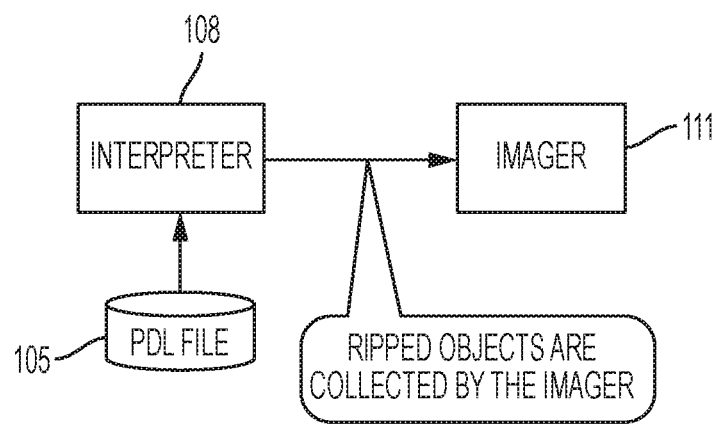
FIG. 1 is a flow diagram illustrating a broad overview of a process according to systems and methods herein.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

As used herein, an image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

The printing devices and methods disclosed herein provide the capability to automatically determine (on a page-by-page basis) whether the extended colorant will be used in the printed output for a job and the order for applying each colorant. The capability comprehends all the input image types (e.g., RGB source, CMYK source, spot) within the page description language (PDL) file and the job programming (e.g., spot rendering with the CMYK colorants+extended gamut colorant).

As shown FIG. 1, an incoming job may include a PDL file 105 that describes the appearance of a printed page according to the job. The input may be a page description using a page description language (PDL). A page description language (PDL) is a computer language that describes for the print engine the appearance of a printed page in a higher level than an actual output bitmap. The PDL file 105 specifies the arrangement of the printed page through commands for the print engine. An interpreter 108 may be used in a preprocessing step to interpret a specified number of job pages.

An exemplary processing system may include an interpreter 108 and an imager 111, as shown in FIG. 1. The interpreter 108 and imager 111 are classic components of a two-part raster image processor (RIP), such as may be used to prepare the job for printing. As would be known by one skilled in the art, a raster image processor is a component used in a printing system that produces a raster image, also known as a bitmap. The bitmap is then sent to a printing device for output. Raster image processing is the process that turns the job input information into a high-resolution raster image. The input may be a page description using a page description language (PDL) of higher or lower resolution than the output device. In the latter case, the RIP applies either smoothing or interpolation to the input bitmap to generate the output bitmap.

According to systems and methods herein, the interpreter parses the PDL file 105 according to PDL-specific language constructs, and changes these into pdl-language neutral "objects" that are presented to the imager 111 for collection. In this way, various language-specific interpreters can be mated with a single imager implementation.

All the color spaces in the PDL (RGB, CMYK, Spots) are rendered by the raster image processor (containing all the raster image processing complexity to the main color+optional color print space. This print space is then evaluated to determine the order of applying each colorant including a spot color in the print job.

To print an image, a print engine processor, sometimes referred to herein as an image processor, converts the image in a page description language or vector graphics format to a bit mapped image indicating a value to print at each pixel of the image. Each pixel may represent a dot, also called a picture element. The sequence of dots forming a character is called a raster pattern. The number of dots per inch that a printer generates is called the print resolution, or density. A resolution of 240 pixels means that a printer prints 240 pixels per inch both vertically and horizontally, or 57,200 pixels per square inch (240×240).

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, an RGB-to-YCbCr converter to obtain luminance (Y) and chrominance (Cb, Cr) values. It should be appreciated that pixels may be represented by values other than RGB or YCbCr.

Each bit representing a pixel that is "on" is converted to an electronic pulse. The electronic pulses generated from the raster pixel data at which to deposit toner turns the laser beam on to positively charge the surface of a rotating drum, which is an organic photo-conducting cartridge (OPC), that has a coating capable of holding an electrostatic charge. The laser beam turns on and off to beam charges at pixel areas on a scan line across the drum that will ultimately represent the output image. After the laser beam charges all pixels on the scan line indicated in the raster data, the drum rotates so the laser beam can place charges on the next scan line. The drum with the electrostatic positive charges then passes over negatively charged toner. The negatively charged toner is then attracted to the positive charged areas of the drum that form the image. The paper, which is negatively charged, passes over the roller drum and attracts the toner as the areas of the roller drum with the toner are positively charged to transfer the toner forming the image from the roller drum to the paper.

Figure 2:
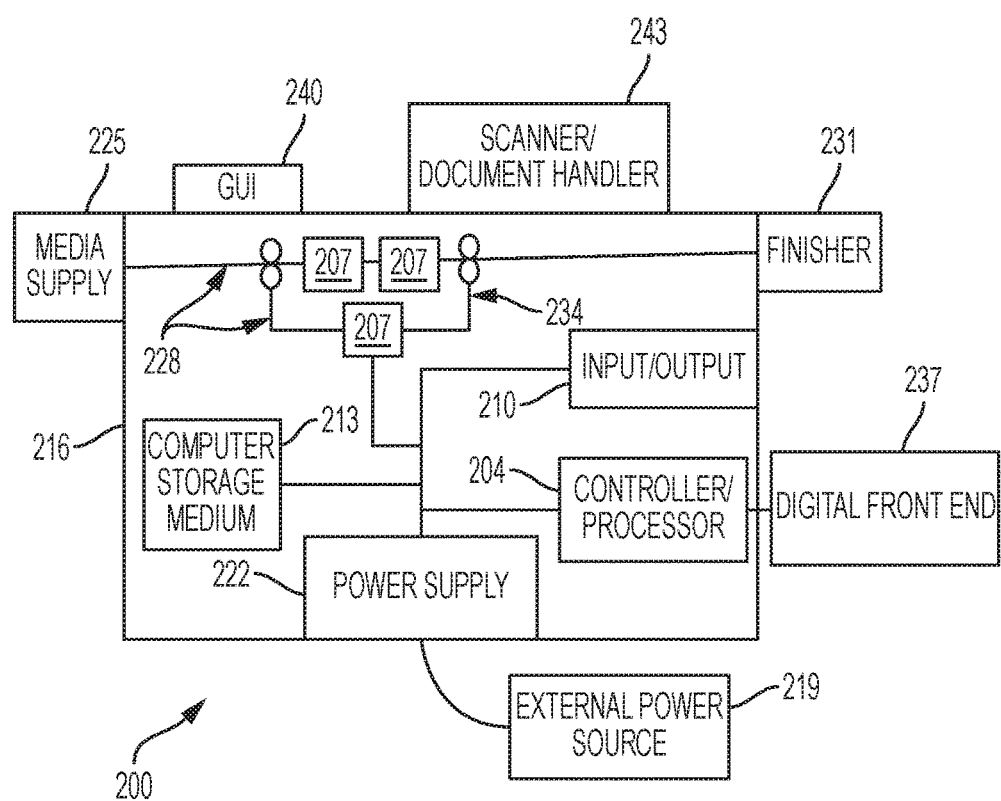
FIG. 2 is a schematic diagram illustrating printing devices herein.

FIG. 2 illustrates many components of an exemplary multi-function device (MFD) 200, which can be used with methods herein. The MFD 200 includes a controller/processor 204 and at least one marking device (print engine(s)) 207 operatively connected to the controller/processor 204. The MFD 200 may also include a communications port (Input/Output device 210) operatively connected to the controller/processor 204 and to a computerized network external to the MFD 200. The Input/Output device 210 may be used for communications to and from the MFD 200.

The controller/processor 204 controls the various actions of the MFD 200, as described below. A non-transitory computer storage medium device 213 (which can be optical, magnetic, capacitor based, etc.) is readable by the controller/processor 204 and stores instructions that the controller/processor 204 executes to allow the MFD 200 to perform its various functions, such as those described herein.

According to systems and methods herein, the controller/processor 204 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 200 is special purpose machine that includes a specialized image processing card having unique ASICs for providing color image processing, includes specialized boards having unique ASICs for input and output devices to speed network communications processing, a specialized ASIC processor that performs the logic of the methods described herein using dedicated unique hardware logic circuits, etc. It is contemplated that the controller/processor 204 may comprise a raster image processor (RIP). A raster image processor uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 2, a body housing 216 has one or more functional components that operate on power supplied from an external power source 219, which may comprise an alternating current (AC) power source, through the power supply 222. The power supply 222 can comprise a power storage element (e.g., a battery) and connects to the external power source 219. The power supply 222 converts the power from the external power source 219 into the type of power needed by the various components of the MFD 200.

The multi-function device 200 herein has a media supply 225 supplying media to a media path 228. The media path 228 can comprise any combination of belts, rollers, nips, drive wheels, vacuum devices, air devices, etc. The print engine(s) 207 is positioned along the media path 228. That is, the multi-function device 200 comprises a document-processing device having the print engine(s) 207. The print engine(s) 207 prints marks on the media. After receiving various markings from the print engine(s) 207, the sheets of media can optionally pass to a finisher 231 which can fold, staple, sort, etc., the various printed sheets. As described herein, a return paper path 234 may deliver the printed sheets to the same or different print engine 207 for at least a second layer of toner/ink to be applied. Each return of the media to the print engine 207 is referred to herein as a "pass".

The print engine(s) 207 may be any device capable of rendering the image. The set of marking devices includes, but is not limited to, digital document reproduction equipment and other copier systems, as are widely known in commerce, photographic production and reproduction equipment, monitors and other displays, computer workstations and servers, including a wide variety of color marking devices, and the like. That is, the print engine(s) 207 may include a color toner/ink-applying component (i.e., a source of pigmented toner) that supplies at least pigmented colorant for applying colored toner/ink to the media passing through the print engine(s) 207.

To render an image is to reduce the image data (or a signal thereof) to viewable form; store the image data to memory or a storage device for subsequent retrieval; or communicate the image data to another device. Such communication may take the form of transmitting a digital signal of the image data over a network.

Figure 8:
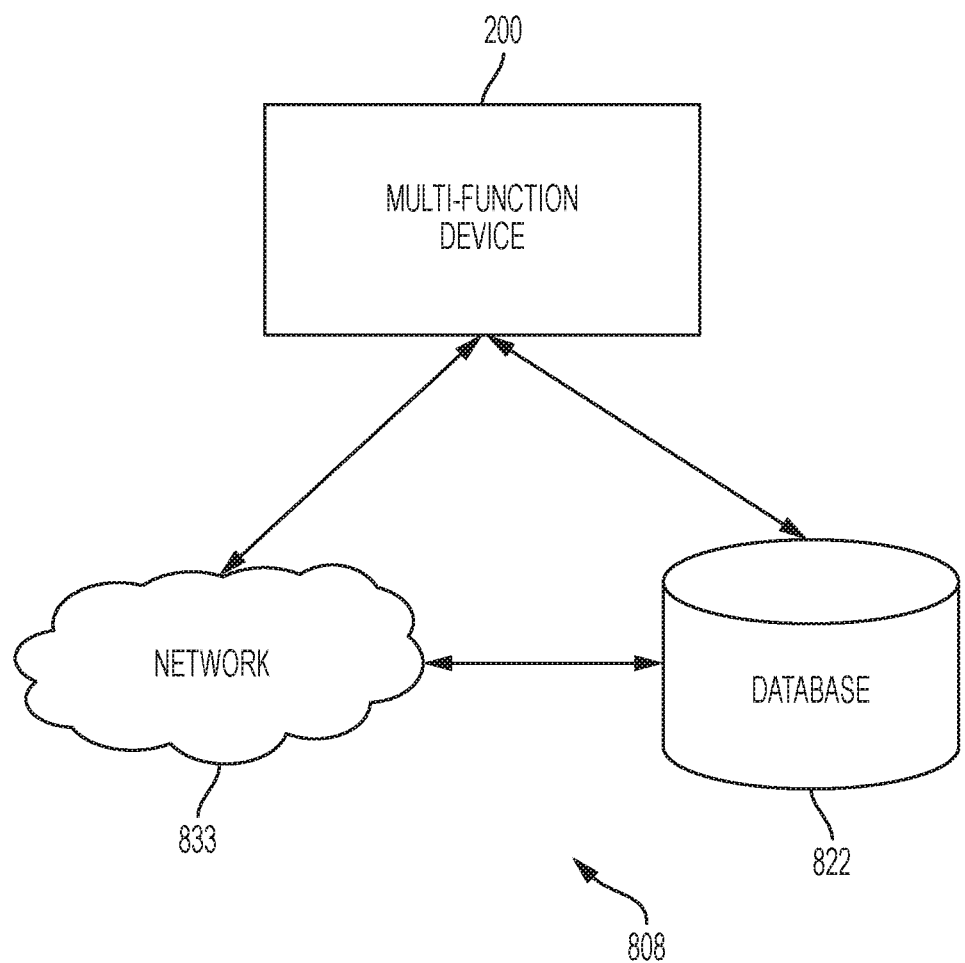
FIG. 8 is a block diagram of a network according to systems and methods herein.

A Digital Front End (DFE) 237 may be connected to the controller/processor 104 of the MFD 200. The DFE 237 prepares and processes a job for the print engine(s) 207 and may include one or more RIPs (raster image processors) that render from a page description language (PDL) such as PostScript, PDF or XPS to a raster: a pixel-based representation of the page suitable for delivery to the print heads of the print engine(s) 207. The DFE 237 is able to load files from various sources on a network, such as shown in FIG. 8, and process them in order to be printed on digital equipment, whether it be a small desktop printer or a large digital press. The controller/processor 104 takes the imposed print ready input from the DFE 237 and controls the print engine(s) 207 for printing.

In addition, the MFD 200 can include at least one accessory functional component, such as a graphic user interface (GUI) assembly 240 or other accessory functional component (such as a scanner/document handler 243, automatic document feeder (ADF), etc.) that operate on the power supplied from the external power source 219 (through the power supply 222).

As would be understood by those ordinarily skilled in the art, the multi-function device 200 shown in FIG. 2 is only one example and the systems and methods herein are equally applicable to other types of devices that may include fewer components or more components. For example, while a limited number of print engines and media paths are illustrated in FIG. 2, those ordinarily skilled in the art would understand that many more paper paths and additional print engines could be included within any device used with embodiments herein.

Figure 3A:
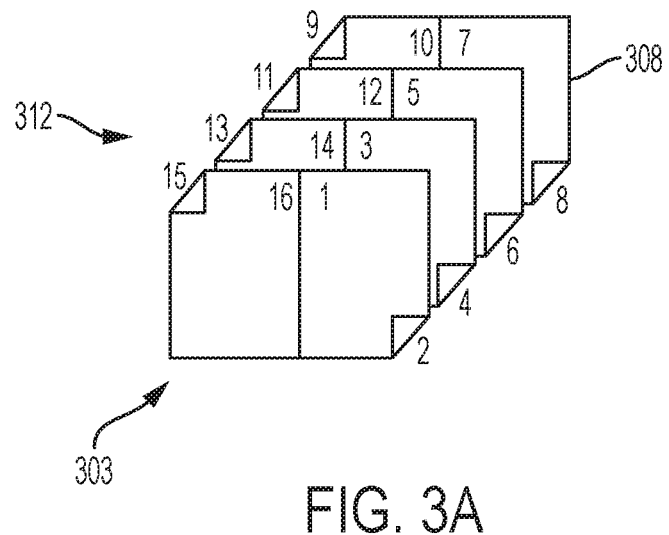
FIGS. 3A-3C show a representation of aligned pages after imposition is applied and how a final product might appear after finishing.
Figure 3B:
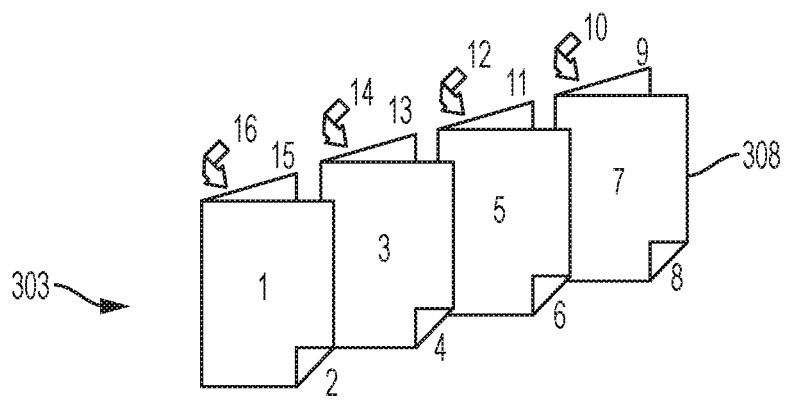

Referring to FIGS. 3A and 3B, a signature 303 is a group of pages 308 that are printed on both sides of a sheet of print media, generally shown as 312. The print media 312 is then folded, cut, and trimmed down to the finished page size. The number of pages 308 on a signature depends on the size of the page and the size of the print media 312 that the pages are fit on. Imposition refers to the placement and direction of the pages 308 contained in a signature 303. Some pages may appear upside down or backwards, but once the sheet is folded and cut, the pages will be in their proper position and sequence. FIG. 3A shows a stacked output of an exemplary sixteen-page signature using a press sheet with four pages printed on each side. FIG. 3B shows how final product might appear after printing and folding. Such an output may sometimes be known as a booklet.

As described above, printing or rendering a surface on a sheet of print media using a user specified colorant order has been an existing and well-used feature in heavy production printing houses. In some cases, a spot color may be added before the standard color gamut (e.g., Gold+CMYK). In other cases, a spot color may be added after the standard color gamut (e.g., CMYK+Silver). However, it has been observed that if a single surface has different logical pages and the different logical pages require different print colorant order, then there is no design currently available to render images on the same side of a sheet using different print colorant orders. For instance, given X and Z as any spot color, a user may want one logical page on a sheet to be printed as X+CMYK+Z and another logical page on the same sheet to be printed as Z+CMYK+X in a single surface.

Figure 3C:
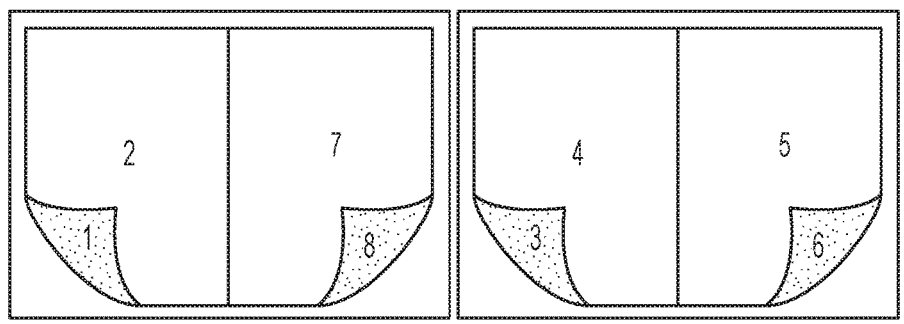

For simplicity, FIG. 3C shows an example where two logical pages are placed on the same surface in the hard print. Note that page 2 and page 7 are placed on the same surface and that they may have different colored objects. In a non-limiting example, a user may want to print page 2 using Gold+CMYK+Silver and page 7 using Silver+CMYK+Gold. Similarly, page 1 and page 8 are placed on the same surface, opposite the surface for pages 2 and 7, and they may have different colored objects.

Figure 4A:
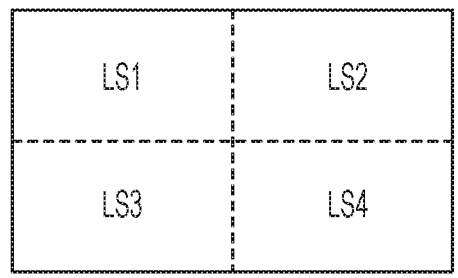
FIGS. 4A-4C show exemplary logical sheets according to systems and methods herein.
Figure 4B:
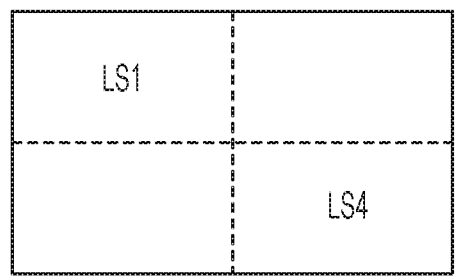
Figure 4C:
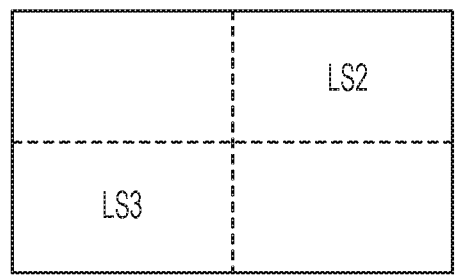

For this example, assume one document contains four logical pages namely LS1, LS2, LS3, and LS4, respectively. FIG. 4A is an illustration of the expected output where a surface is being shared by four different logical pages. In this example, the user has set N-up for a 2×2 application. The print colorant order for this example is Gold+CMYK+Silver for LS1 and LS4 and Silver+CMYK+Gold for LS2 and LS3, respectively. The printed sheet may have LS1 and LS4 using Gold+CMYK+Silver as the first print colorant order, as shown in FIG. 4B. Then, the printed sheet may also have LS2 and LS3 using Silver+CMYK+Gold as the second print colorant order, as shown in FIG. 4C.

According to systems and methods herein, the number of identical sets of print colorant order is determined, for this example there are two identical sets (Gold+CMYK+Silver and Silver+CMYK+Gold). For this example, two separate buffers are created to accommodate these four logical pages. (Note: this may not be the case when the user sets another print colorant order for another logical page.) One buffer (data and tag) is created of the size of the user selected print media where the logical pages having the same print colorant order (Gold+CMYK+Silver) are accumulated or merged so that it will print on a single page. Another buffer (data and tag) is created of the size of the user selected print media where the logical pages having the same print colorant order (Silver+CMYK+Gold) are accumulated or merged so that it will print on a single page. In this case, on the same side of the same page as the first buffer.

Each buffer will contain the content (data and tag) of logical pages that have same set of print colorant order. Hence, for this example, one buffer will contain the content (data and tag) of LS1 and LS4 that are placed at their intended position (for this example they should be placed diagonally). The rest of the pixels of all separations of the first buffer will be initialized with a value of zero. That is, the pixels for LS2 and LS3 are set to zero, in the first buffer. Any pixel that has value zero is known as a negative pixel and these pixels are called untouched pixels, as they do not belong to any logical page in this buffer. The second buffer will contain the content (data and tag) of LS2 and LS3 (as they share same print colorant order) that are placed at their intended position (for this example they should be placed diagonally). The rest of the pixels of all separations of the second buffer will be initialized with a value of zero. That is, the pixels for LS1 and LS4 are set to zero, in the second buffer. First, the first buffer, with only LS1 and LS4, will be sent to print. After the print, the print media will be returned to the print engine. Then, the second buffer, with only LS2 and LS3 will be sent to print. In each case, the pixels for the logical pages with a different colorant print order are initialized with a value of zero. If there are other sets of print colorant order then additional buffers are created and the printed media would be brought back to the print engine to print each buffer on the same side of the page.

It is contemplated that the method disclosed herein can also be used to support application of multiple Tone Reproduction Curves (TRCs) to different logical cells on single surface. To be precise, if a user wants to apply a first TRC to LS1 and LS4, then one buffer is created having the specified TRC effect. LS2 and LS3 will be placed in another buffer with separate TRC information. According to systems and methods herein, the use of multiple buffers can have the effect of multiple TRCs on a single sheet of print media.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

Figure 5:
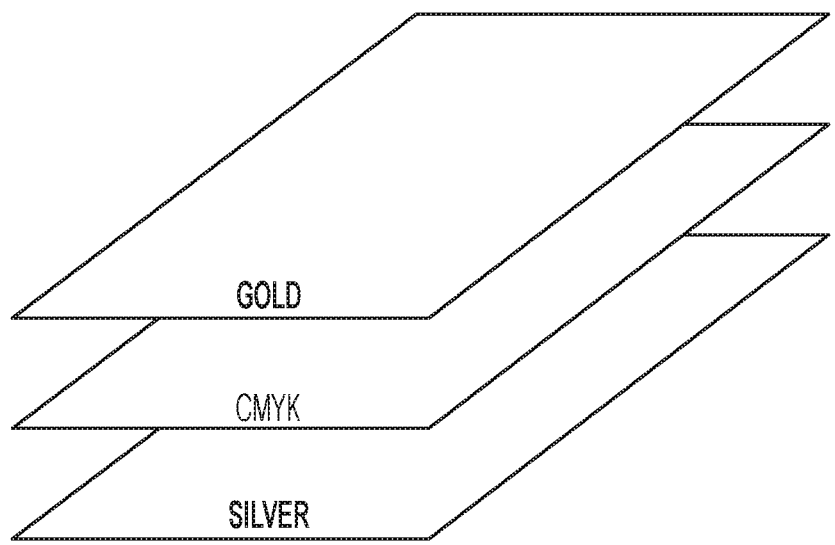
FIGS. 5 and 6 illustrate different orders of color planes according to systems and methods herein.
Figure 6:
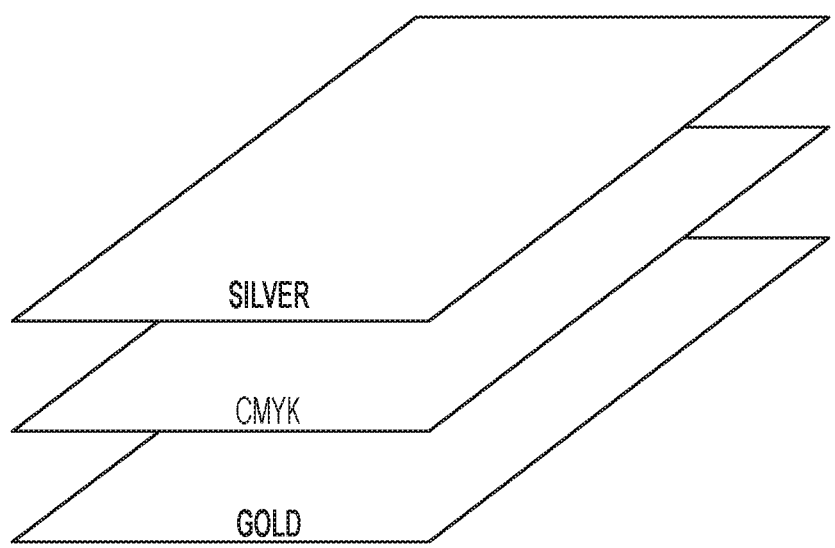

FIG. 5 shows a series of color planes for the first buffer that includes Gold+CMYK+Silver, which will be applied to logical pages LS1 and LS4, according to the present example. FIG. 6 shows a series of color planes for the second buffer that includes Silver+CMYK+Gold, which will be applied to logical pages LS2 and LS3, according to the present example.

Figure 7:
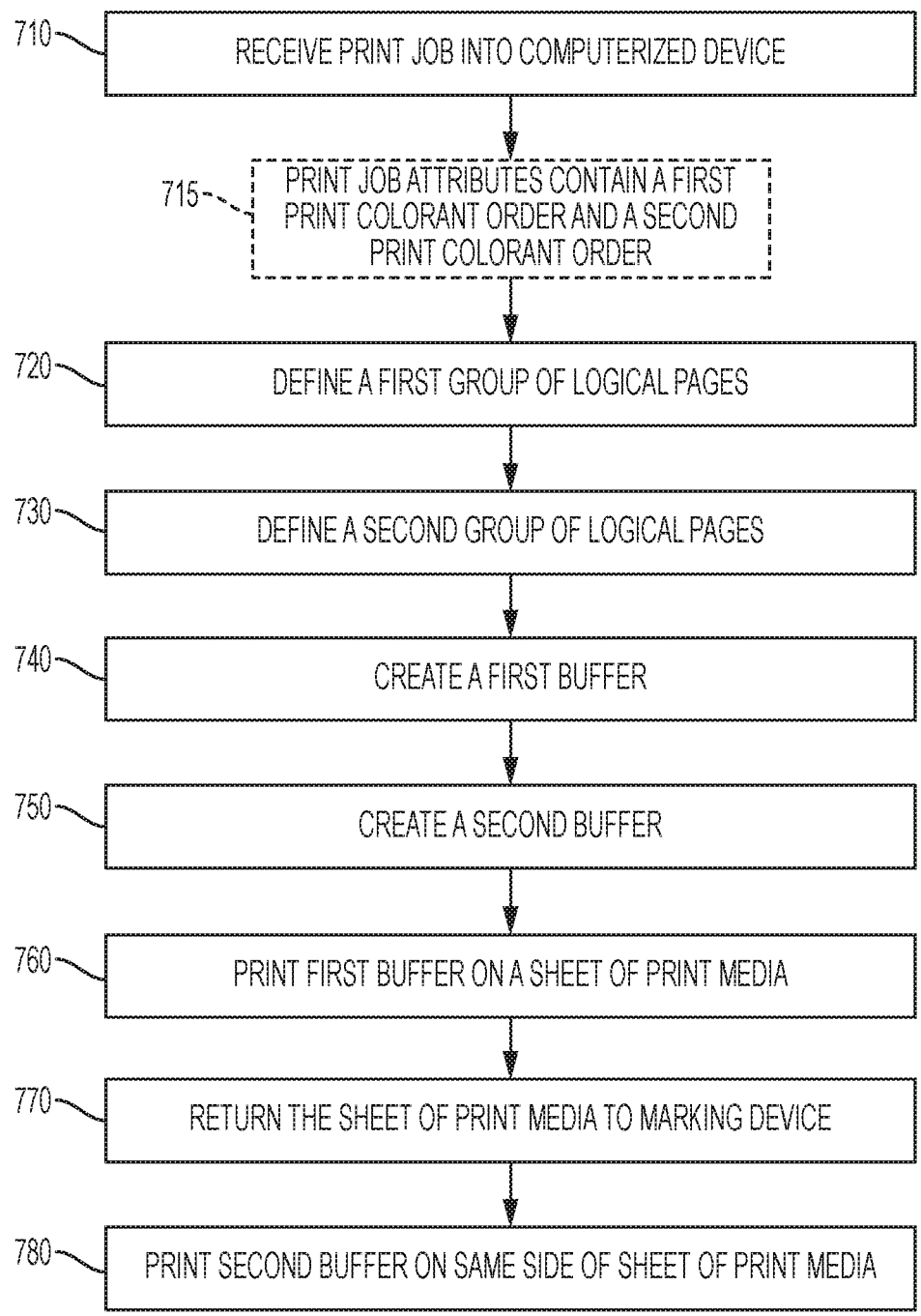
FIG. 7 is a flow chart illustrating methods herein.

FIG. 7 is a flow diagram illustrating the processing flow of an exemplary method for rendering a surface using user specified colorant order according to the present disclosure. At 710, a print job is received into a computerized device. The computerized device includes a marking device. The print job includes an electronic document and print job attributes including an imposition template defining multiple logical pages for a single sheet of print media according to the electronic document. The print job attributes contain a first print colorant order and a second print colorant order that is different from the first print colorant order, as noted at 715. At 720, a first group of logical pages is defined. The first group of logical pages takes the first print colorant order, according to the print job. At 730, a second group of logical pages is defined. The second group of logical pages takes the second print colorant order, according to the print job. At 740, first information is created in a first buffer by merging raster data associated with the first group of logical pages and marking untouched pixels as negative pixels. At 750, second information is created in a second buffer by merging raster data associated with the second group of logical pages and marking untouched pixels as negative pixels. At 760, the first information from the first buffer is printed on a sheet of print media, using the marking device. Following printing of the first information from the first buffer on the sheet of print media, at 770, the sheet of print media is returned to the marking device. At 780, the second information from the second buffer is printed on the same side of the sheet of print media, using the marking device.

It is contemplated that existing system will be able to print a single surface comprised of multiple logical pages that have different print colorant order. To achieve this, below steps may be followed as part of the methodology.

1. Determine any conflict of print colorant order from the print job.
2. Populate the Job Description File (JDF) with the page range and their corresponding print colorant order.
3. Decompose each logical page according to printing instructions.
4. Make groups of logical surfaces that have similar print colorant order.
5. Create a first buffer (data and tag) of equivalent dimension of the selected print media where raster (data and tag) of logical pages that belong to same group get merged and untouched pixels are made as negative pixels.
6. Create another buffer (data and tag) of equivalent dimension of the selected print media to consolidate another set of raster (data and tag) of the rest of the logical pages where raster of logical pages that belong to same group get merged and untouched pixels are made as negative pixels.

7. The Marker performs marking tasks separately for these two buffers. Once one raster is printed then the stock is again brought back to the engine to print another raster of different print colorant order on the same side of the sheet of print media.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device. An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

FIG. 8 is a general overview block diagram of a network, indicated generally as 808, for communication between the multi-function device 200 and a database 822. The multi-function device 200 may comprise any form of processor as described in detail above. The multi-function device 200 can be programmed with appropriate application software to implement the methods described herein. Alternatively, the multi-function device 200 is a special purpose machine that is specialized for processing image data and includes a dedicated processor that would not operate like a general purpose processor because the dedicated processor has application specific integrated circuits (ASICs) that are specialized for the handling of image processing operations, processing pixel data, etc. In one example, the multi-function device 200 is special purpose machine that includes a specialized card having unique ASICs for providing image processing instructions, includes specialized boards having unique ASICs for input and output devices to speed network communications processing, a specialized ASIC processor that performs the logic of the methods described herein (such as the processing shown in FIG. 7) using dedicated unique hardware logic circuits, etc.

Database 822 includes any database or any set of records or data that the multi-function device 200 desires to retrieve. Database 822 may be any organized collection of data operating with any type of database management system. The database 822 may contain matrices of datasets comprising multi-relational data elements.

The database 822 may communicate with the multi-function device 200 directly. Alternatively, the database 822 may communicate with the multi-function device 200 over network 833. The network 833 comprises a communication network either internal or external, for affecting communication between the multi-function device 200 and the database 822.

Figure 9:
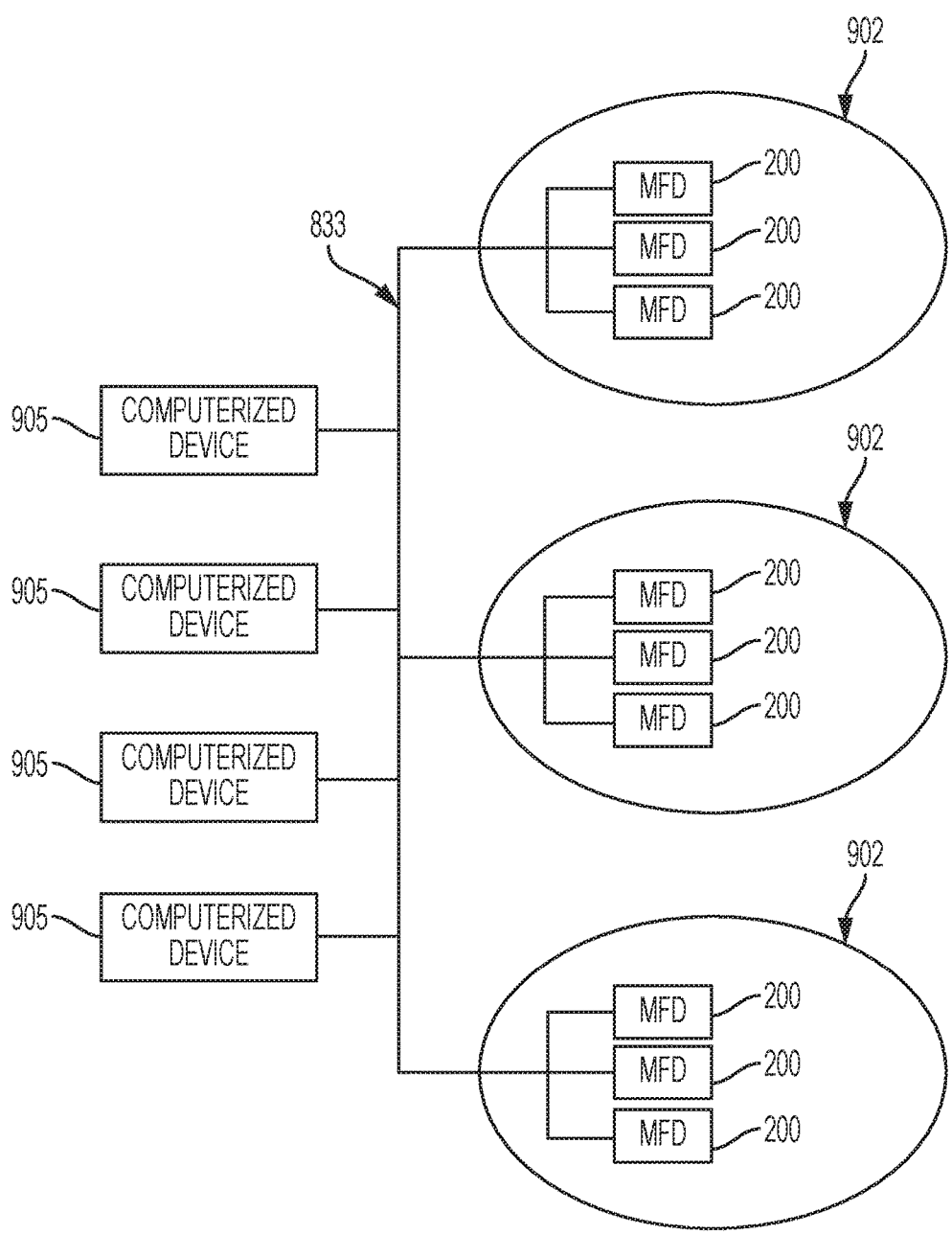
FIG. 9 is a schematic diagram illustrating systems and methods herein.

As shown in FIG. 9, exemplary printers, copiers, multi-function machines, and multi-function devices (MFD) 200 may be located at various different physical locations 902. Other devices according to systems and methods herein may include various computerized devices 905. The computerized devices 905 can include print servers, printing devices, personal computers, etc., and are in communication (operatively connected to one another) by way of the network 833. The network 833 may be any type of network, including a local area network (LAN), a wide area network (WAN), or a global computer network, such as the Internet.

To render an image is to reduce the image data (or a signal thereof) to viewable form; store the image data to memory or a storage device for subsequent retrieval; or communicate the image data to another device. Such communication may take the form of transmitting a digital signal of the image data over a network.

According to a further system and method herein, an article of manufacture is provided that includes a tangible computer readable medium having computer readable instructions embodied therein for performing the steps of the computer implemented methods, including, but not limited to, the method illustrated in FIG. 7. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 7.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, electronically altering color schemes using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a 'circuit', 'module, or 'system.' Furthermore, aspects of the present disclosure may take the form of a computer program product embodied in one or more computer readable medium(s) having computer readable program code embodied thereon.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, the claims presented below are not intended to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, print engines, etc., are well known, and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', 'includes', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus process elements in the claims below are intended to include any structure, material, or act for performing the process in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method comprising:
    receiving a print job into a computerized device comprising a marking device, said print job comprising an electronic document and print job attributes including an imposition template defining multiple logical pages for a single sheet of print media according to said electronic document, said print job attributes comprising a first print colorant order and a second print colorant order different from said first print colorant order;
    defining a first group of logical pages having said first print colorant order and a second group of logical pages having said second print colorant order, according to said print job;
    creating first information in a first buffer by merging raster data associated with said first group of logical pages, and marking untouched pixels as negative pixels;
    creating second information in a second buffer by merging raster data associated with said second group of logical pages, and marking untouched pixels as negative pixels;
    printing said first information from said first buffer on a sheet of print media, using said marking device;
    following said printing said first information from said first buffer on said sheet of print media, returning said sheet of print media to said marking device; and
    printing said second information from said second buffer on the same side of said sheet of print media, using said marking device.

2. The method according to claim 1, wherein each print colorant order includes standard colorants and a spot color.

3. The method according to claim 2, said standard colorants comprising cyan, yellow, magenta, red, green, blue, and black.

4. The method according to claim 1, wherein all pixels for the logical pages that are not in said first group of logical pages are set to zero in said first buffer and all pixels for the logical pages that are not in said second group of logical pages are set to zero in said second buffer.

5. The method according to claim 1, further comprising: decomposing each logical page using a raster image processor.

6. The method according to claim 1, wherein said first print colorant order uses a first tone reproduction curve (TRC) and said second print colorant order uses a second TRC, different from said first TRC.

7. A method, comprising:
receiving a print job into a computerized device, said print job comprising an electronic document and print job attributes including an imposition template defining multiple logical pages for a single sheet of print media according to said electronic document;
displaying, on a user interface of said computerized device, a menu option to define print colorant order for selected logical pages of said electronic document;
receiving input into said user interface to identify a first print colorant order associated with a first group of logical pages and a second print colorant order associated with a second group of logical pages, said second print colorant order being different from said first print colorant order;
creating first information in a first buffer by merging raster data associated with said first group of logical pages, and marking untouched pixels as negative pixels; and
creating second information in a second buffer by merging raster data associated with said second group of logical pages, and marking untouched pixels as negative pixels.

8. The method according to claim 7, further comprising:
printing said first information from said first buffer on a sheet of print media, using a marking device;
following said printing said first information from said first buffer on said sheet of print media, returning said sheet of print media to said marking device; and
printing said second information from said second buffer on the same side of said sheet of print media, using said marking device.

9. The method according to claim 7, wherein each print colorant order includes standard colorants and a spot color.

10. The method according to claim 9, said standard colorants comprising cyan, yellow, magenta, red, green, blue, and black.

11. The method according to claim 7, wherein all pixels for the logical pages that are not in said first group of logical pages are set to zero in said first buffer and all pixels for the logical pages that are not in said second group of logical pages are set to zero in said second buffer.

12. The method according to claim 7, further comprising: decomposing each logical page using a raster image processor.

13. The method according to claim 7, further comprising: receiving input into said user interface to identify a first Tone Reproduction Curve (TRC) and a second TRC, different from said first TRC to use with said print job.

14. The method according to claim 13, wherein said first print colorant order corresponds to said first TRC and said second print colorant order corresponds to said second TRC.

15. A printing device, comprising:
an input device receiving a print job, said print job comprising an electronic document and print job attributes including an imposition template defining multiple logical pages for a single sheet of print media according to said electronic document, said print job attributes comprising a first print colorant order and a second print colorant order different from said first print colorant order;
a processor operatively connected to said input device; and
a marking device operatively connected to said processor,
said processor defining a first group of logical pages having said first print colorant order and a second group of logical pages having said second print colorant order, according to said print job,
said processor creating first information in a first buffer by merging raster data associated with said first group of logical pages, and marking untouched pixels as negative pixels,
said processor creating second information in a second buffer by merging raster data associated with said second group of logical pages, and marking untouched pixels as negative pixels
printing said first information from said first buffer on a sheet of print media, using said marking device,
following said printing said first information from said first buffer on said sheet of print media, said processor returning said sheet of print media to said marking device, and
printing said second information from said second buffer on the same side of said sheet of print media, using said marking device.

16. The printing device according to claim 15, wherein each print colorant order includes standard colorants and a spot color.

17. The printing device according to claim 16, said standard colorants comprising cyan, yellow, magenta, red, green, blue, and black.

18. The printing device according to claim 15, wherein all pixels for the logical pages that are not in said first group of logical pages are set to zero in said first buffer and all pixels for the logical pages that are not in said second group of logical pages are set to zero in said second buffer.

19. The printing device according to claim 15, said processor comprising a raster image processor decomposing each logical page using said raster image processor.

20. The printing device according to claim 15, wherein said first print colorant order uses a first tone reproduction curve (TRC) and said second print colorant order uses a second TRC, different from said first TRC.

* * * * *